United States Patent [19]
Anderson

[11] Patent Number: 5,445,358
[45] Date of Patent: Aug. 29, 1995

[54] EXHAUST TYPE QUICK ACTION COUPLER

[75] Inventor: Keith J. Anderson, Maple Grove, Minn.

[73] Assignee: Parker-Hannifin Corporation, Cleveland, Ohio

[21] Appl. No.: 358,216

[22] Filed: Dec. 16, 1994

[51] Int. Cl.⁶ ............................................. F16L 37/28
[52] U.S. Cl. ................... 251/149.6; 285/316
[58] Field of Search .......................... 251/149.6, 149.9; 137/614.04, 614.05, 614.06; 285/305, 315, 316, 306

[56] References Cited

U.S. PATENT DOCUMENTS

| | | |
|---|---|---|
| Re. 27,364 | 5/1972 | German. |
| 3,106,378 | 12/1960 | Hellstern. |
| 3,106,379 | 3/1961 | Sciuto et al. |
| 3,127,149 | 4/1963 | Cruse. |
| 3,211,178 | 7/1961 | Kiszko. |
| 3,378,225 | 10/1965 | Snyder, Jr. |
| 3,423,063 | 10/1966 | German. |
| 3,477,688 | 10/1966 | Cruse. |
| 3,567,175 | 3/1971 | Sciuto, Jr. |
| 3,715,099 | 6/1971 | Shendure. |
| 3,948,547 | 4/1976 | Gache. |
| 4,094,567 | 6/1978 | Karcher et al. |
| 4,311,328 | 1/1982 | Truchet. |
| 4,366,945 | 1/1983 | Blauenstein. |
| 4,397,445 | 8/1983 | Burquier. |
| 4,437,647 | 3/1984 | Cruse. |
| 4,483,510 | 11/1984 | Palau et al. |
| 4,494,728 | 1/1985 | Cruse. |
| 4,546,956 | 10/1985 | Moberg. |

(List continued on next page.)

FOREIGN PATENT DOCUMENTS

| | | |
|---|---|---|
| 7232067 | 3/1974 | France. |
| 7430807 | 4/1976 | France. |
| 7622445 | 2/1978 | France. |
| 7710172 | 10/1978 | France. |
| 8115656 | 2/1983 | France. |
| 8209828 | 12/1983 | France. |
| 52262 | 6/1977 | Israel. |

OTHER PUBLICATIONS

Hansen Couplings Catalog of One-Way Shut-Off Couplings, No. 70-3 Copyright 1981.

(List continued on next page.)

Primary Examiner—Martin P. Schwadron
Assistant Examiner—Kevin L. Lee
Attorney, Agent, or Firm—Christopher H. Hunter

[57] ABSTRACT

A push-to-connect type coupler has an intermediate venting position for the nipple. The coupler includes a coupler socket having an inner sleeve, an intermediate coupler body, and an outer sleeve formed from tubular or cylindrical components which are axially movable with respect to one another. A valve member is disposed axially within the coupler and is normally biased into a closed position. The inner sleeve of the coupler is spring-biased toward the opening of the coupler, and includes an inner set of captive coupling balls. The coupler body also has an outer set of captive coupling balls, and a locking mechanism is disposed between the coupler body and the outer sleeve. When the nipple is inserted into the coupler, the nipple is retained by the interaction of the outer set of coupling balls with a deep groove in the inner sleeve, and the inner set of coupling balls with a channel formed in the nipple. The nipple also opens the valve member within the coupler, thus allowing pressurized air to pass through the coupler. When the nipple is to be removed, the outer sleeve is initially moved rearwardly (upstream), the outer set of coupling balls move radially outward, which allows the inner sleeve, and hence the nipple, to move outwardly a predetermined amount until the outer set of coupling balls engages a shallow groove in the inner sleeve. In this position, the valve member is closed and pressure downstream of the nipple can exhaust to atmosphere. To fully disconnect the nipple from the coupler socket, the outer sleeve is moved forwardly (downstream), which allows the outer set of coupling balls to move further radially outward, and allows the inner sleeve to move further outwardly from the coupler until the inner set of coupling balls releases the nipple, which thereby allows the nipple to be fully disconnected from the coupler socket.

27 Claims, 5 Drawing Sheets

U.S. PATENT DOCUMENTS 5,083,588 1/1992 Truchet .
5,090,448 2/1992 Truchet .
5,213,309 5/1993 Makishima .................. 251/149.6
5,290,009 3/1994 Heilmann .
5,323,812 6/1994 Wayne .......................... 285/316 X

OTHER PUBLICATIONS

Pages from DynaQuip Catalog (Chemetron Corporation) received in 1978, for DC Series Single Shut-off Exhaust Coupling, pp. 7 and 8. KL Mar. 3, 1995.

Page 59 from Dynaquip Controls Catalog No. FLC-690 received in Nov. 1990, for Safety Vent 2000 Quick Connect Couplings.

Aro Corporation Catalog, pp. 24–25 for Full-Bore Air Line Couplers. Published Dec., 1982.

Foster Manufacturing Co., Inc. Catalog, pp. 3, 4, 5 and 6, for One-Way Shut-Off Detachable Couplers. Published 1990.

EXHAUST TYPE QUICK ACTION COUPLER

FIELD OF THE INVENTION

The present invention relates to a valved, fluid-tight coupling, and more particularly to a coupler which has an intermediate venting position prior to disconnecting a nipple to exhaust the pressure within the coupler.

BACKGROUND OF THE INVENTION

Couplers are well-known devices to interconnect hoses or tubes in a fluid flow system. A coupler typically includes a coupler socket (female element) and a nipple (male element). The coupler socket is attached by a first hose or tube to a source of fluid, e.g., a compressed air source, while the nipple is attached by a second hose or tube to e.g., a tool or machine. When the nipple is inserted into the coupler socket, a closure valve mounted within the socket opens to provide a fluid flow path through the coupler. At the same time, a catch or coupling mechanism automatically engages the nipple to retain the nipple within the socket. The coupling mechanism can be selectively manually released to disconnect the nipple from the coupler socket. Such a coupler is typically referred to as a "push-to-connect" coupler.

In certain segments of the industry, the configuration of the nipple for pressurized air lines is fairly standard. For example, in the pressurized air industry, the ISO 6150 Series B nipple (i.e., the "industrial interchange" nipple) is generally accepted in the United States for air hose couplers. The Series B nipple includes a tubular shank or plug circumscribing a central bore and a downstream port which enables the nipple to be connected to an air hose or tube. The shank of the nipple narrows down at its inlet end and a circumferential, slightly rounded ridge is formed about the midpoint of this narrow portion. A groove or channel is defined between the ridge and the remainder of the shank. When the nipple is inserted into the socket, the coupling mechanism is received in the groove and engages the ridge on the shank to retain the nipple within the coupler socket.

A number of different types of coupler sockets have been developed for retaining the Series B type of nipple within the coupler. One popular type of coupler socket provides an venting function before the nipple is fully disconnected. This venting function allows pressurized air (or other fluid) within the coupler to be exhausted from the coupler socket before the nipple is entirely disconnected.

An example of this type of coupler socket is shown in Palau, et al., U.S. Pat. No. 4,483,510. The Palau coupler socket moves the nipple to an intermediate position for venting pressure within the coupler before the nipple is entirely released. A spring-biased tubular lock element (i.e., a "push button") is mounted for radial movement on the coupler body. A single tooth is provided on one inner side of the push button and projects radially inward, while a pair of teeth are provided on the diametrically opposite inner side of the push button and project radially inward from the opposite direction. The teeth are designed to engage the ridge on the nipple in two successive inward displacements of the push button. The first displacement allows the nipple to move into an intermediate venting position, while the second displacement releases the nipple and allows the nipple to be fully disconnected. French Patent No. 2 511 115 shows a similar coupler wherein an upper push button is initially pushed radially inward to allow the nipple to move to an intermediate venting position, and then a lower push button is pushed radially inward to allow the nipple to be fully released and removed from the coupler socket.

Blauenstein, U.S. Pat. No. 4,366,945, Moberg, U.S. Pat. No. 4,546,956 and Heilmann, U.S. Pat. No. 5,290,009, also show couplers which allow the nipple to move to an intermediate venting position before the nipple is fully released from the coupler socket. The Heilmann and Moberg patents have an axially movable outer cover or sleeve which allows the coupling mechanism to be selectively released. The coupling mechanism retains the nipple within the socket until the pressure within the nipple is reduced to atmospheric pressure. The coupling mechanism then automatically releases the nipple to allow the nipple to be disconnected from the socket. Blauenstein, on the other hand, has locking pins which initially engage and retain the nipple within the socket, and then as an outer cover or sleeve is moved axially, has locking balls which engage and retain the nipple in an intermediate position. The outer cover is again manipulated to fully release the nipple.

German, U.S. Pat. No. 3,434,063 and French Patent No. 2 527 741, also show a similar venting function for the coupler, however, the nipple is not disclosed as being moved to an intermediate position in these references. Rather, German retains the nipple in the locked position and rotates an internal valve, while French 2 527 741 moves an outer sleeve to seal off the air passages within the coupler and then the vents the pressure within the nipple. Both of these patents disclose outer, axially movable covers or sleeves which are manipulated to release the nipple.

While the above-described couplers provide a venting function prior to fully disconnecting the nipple, they are not without drawbacks. Some of the known couplers can be difficult or expensive to manufacture and assemble, particularly when the coupling components are designed for radial movement, or where there are numerous moving parts. Other of the known couplers can be complicated to operate, and require either a combination of rotation and axial sleeve movements, or the operation of two sleeves to provide the connect, venting and disconnect function. Other couplers can be prone to malfunction when contaminants (dirt, oil, etc.) infiltrate the moving parts of the coupler. Still other couplers, particularly those which have an intermediate venting position, are only operable with ISO 6150 Series C type nipples. These types of nipples have a sharp, outwardly-projecting shoulder on the ridge of the nipple to facilitate retaining the nipple within the coupler socket. These types of nipples are not prevalent in the United States, and so the couplers for these nipples do not have widespread applicability to the United States market.

Thus, it is believed that there is a demand in the industry for a push-to-connect type coupler with an intermediate venting function which i) is reliable, ii) is easy to operate, iii) is relatively simple and inexpensive to manufacture and assemble, and iv) can be used with ISO 6150 Series B type nipples which are widely available in the United States.

SUMMARY OF THE INVENTION

The present invention provides a novel and unique push-to-connect type coupler which has an intermediate venting position for the nipple. The coupler is simple and easy to use by moving a single outer sleeve on the coupler socket axially in the forward and rearward directions to move the nipple to the venting position and then to entirely disconnect the nipple. The coupler socket is also formed from axially movable components which are relatively simple and inexpensive to manufacture and assemble. Finally, the coupler socket is particularly designed to be used with IS0 6150 Series B type nipples, which are widely accepted in United States industry.

The coupler socket of the present invention includes an inner sleeve, an intermediate coupler body, and an outer sleeve. The inner sleeve, intermediate coupler body, and outer sleeve are formed from tubular or cylindrical components and are axially movable with respect to one another. A locking mechanism is disposed between the coupler body and the outer sleeve, while a valve member is disposed axially within the coupler and is normally biased into a closed position.

The inner sleeve of the coupler has an inner set of captive coupling balls disposed in radially-extending apertures formed in the sleeve. The inner sleeve is biased by a first spring toward the opening of the coupler. When the nipple is inserted into the coupler socket, the nipple engages the inner sleeve and moves the inner sleeve upstream, away from the opening to the coupler socket and against its bias. In so doing, the inner set of coupling balls are driven radially downward by a shoulder on the coupler body into the circumferential groove in the nipple, and into engagement with the ridge on the nipple. At the same time, the nipple engages and opens the valve member within the coupler, thus allowing pressurized air to pass through the nipple.

The outer sleeve has an outer set of captive coupling balls also disposed in radially-extending apertures. When the nipple moves the inner sleeve away from the opening, the outer set of coupling balls are driven by the locking mechanism into a deep groove on the outer surface of the inner sleeve. The locking mechanism includes a spring and an annular, sleeve-type locking member. The locking member is urged by the spring between the outer set of coupling balls and the outer sleeve to retain the outer coupling balls in the deep groove. The outer set of coupling balls prevents the inner sleeve from moving outward toward the opening of the coupler socket, thus retaining the nipple within the coupler socket.

When the nipple is to be removed from the coupler socket, the outer sleeve is initially moved axially rearward (upstream), which moves the locking mechanism away from the outer set of coupling balls. In so doing, the outer coupling balls are released, which allows the nipple to be urged outwardly from the coupler into an intermediate venting position by the spring bias and system pressure on the inner sleeve. The outer coupling balls are allowed to move radially outward against the outer sleeve and out of engagement with the deep groove in the inner sleeve, but not far enough to be out of engagement with a shallow groove on the outer surface of the inner sleeve. The nipple is retained in the intermediate position by the outer set of coupling balls engaging the shallow groove on the inner sleeve. When the nipple moves to the intermediate position, the valve member returns to its closed position to seal off upstream pressure, and a gap opens between the valve member and nipple such that downstream pressure within the nipple can be exhausted out of the coupler.

To fully disconnect the nipple from the coupler socket, the outer sleeve is moved axially forward (downstream), which allows the outer coupling balls to move further radially outward and out of engagement with the shallow groove in the inner sleeve. The inner sleeve thus moves further axially outward from the coupler, until the inner set of coupling balls are out of engagement with the shoulder on the coupler body. At this point, the inner set of coupling balls can move radially outward, out of engagement with the nipple. The nipple is then released and can be fully disconnected from the socket.

Thus, the present invention provides a novel and unique push-to-connect type coupler with an intermediate venting position which is simple and easy to use, and can operate with standard nipple designs that are common in the U.S. industry. The tubular or cylindrical components of the coupler are relatively simple and inexpensive to manufacture and assemble. Only a simple forward and backward axial movement of the outer sleeve on the coupler is required to move the nipple into an intermediate venting position, and then to entirely disconnect the nipple.

Further features and advantages of the present invention will become apparent upon reviewing the following detailed description and the accompanying drawings.

DETAILED DESCRIPTION OF THE PREFERRED EMBODIMENT

Figure 1:
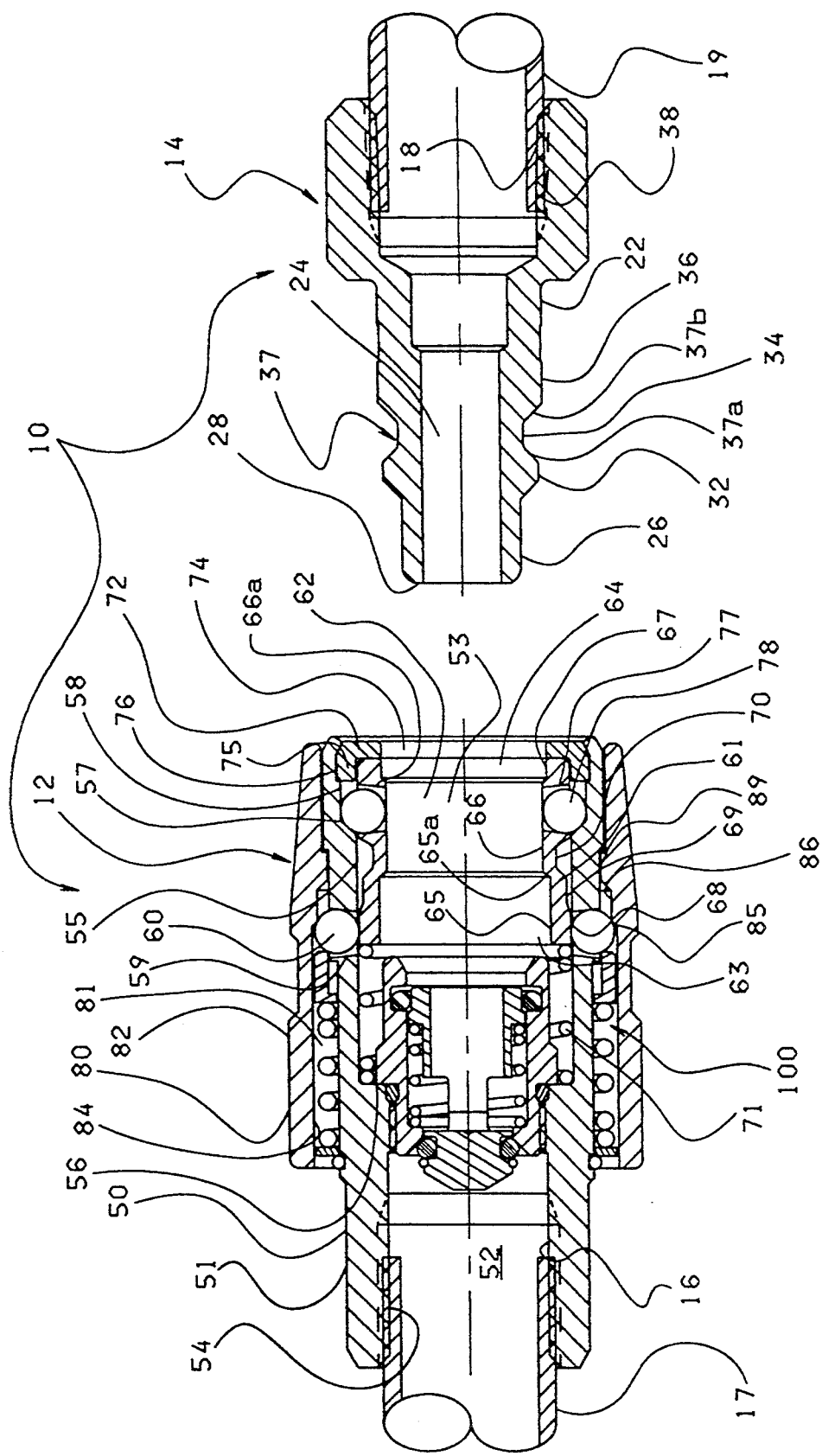
FIG. 1 is a view, in section, of the coupler of the present invention in the fully disengaged position.

Referring to the drawings, and initially to FIG. 1, a coupler constructed according to the present invention is indicated generally at 10. The coupler includes a coupler socket, indicated generally at 12, and a nipple, indicated generally at 14. The coupler socket and nipple are designed to be incorporated into a fluid system, for example, a pneumatic (or compressed air) system to operate a machine or air tool. To this end, the coupler socket 12 includes an upstream port 16 which receives a first fluid conduit 17; e.g., a hose, tube or fitting. The nipple 14 includes a similar downstream port 18, which receives a second fluid conduit 19, e.g., a second hose, tube or fitting. As will be described below, the nipple 14 is designed to be received and retained within the coupler socket 12 to allow fluid to flow from port 16 to port 18 in the fluid system.

The nipple 14 for the coupler is preferably a IS0 6150 Series B type nipple which is widely used in the United States, although the present invention can used with similar types of nipples, which should be apparent to those skilled in the art upon reading the following description. In any case, the nipple 14 includes an outer shank or plug 22 which circumscribes a central bore 24. A narrow, tubular portion 26 with a relatively smooth exterior surface is located adjacent the upstream end 28 of the nipple. The tubular portion 26 tapers radially outward to a circumferentially-extending shoulder or ridge 32, and then tapers inwardly to a second smooth, tubular portion 34. The tubular portion 34 in turn tapers outwardly to an enlarged smooth tubular portion 36. A channel or groove, indicated generally at 37, is thereby formed by the tapered surfaces 37a, 37b surrounding intermediate tubular portion 34. Finally, a port or connecting area 38 is provided at the end of the nipple. Port 38 can have any of a number of configurations to mate with fluid conduits common in the industry. The nipple is preferably formed of conventional high-strength material using well-known techniques.

The coupler socket 12 for the coupler includes a tubular or cylindrical body 50. Coupler body 50 has an outer surface 51 and the body circumscribes a tubular inner bore 52 which extends between upstream opening 16 and downstream opening 53. The bore 52 includes a first inner surface 54 located at the upstream end of the body, and a second inner surface 55, located at the downstream end of the body. The second inner surface 55 has a larger diameter than the first inner surface 54. Shoulder 56 interconnects the first surface 54 and the second surface 55. The second surface 55 tapers further outwardly at shoulder 57 to form a groove or recess 58 adjacent the opening 53 to the coupler body. A plurality of bores or apertures 59 extend radially inward in second surface 55 around the circumference of the coupler body 50. Preferably the coupler body includes a minimum of three bores disposed in equal, spaced-apart relation around the coupler body. Each bore 59 receives a coupling ball member 60 to define an outer set of coupling balls. Bores 59 are inwardly tapered to an extent such that coupling balls 60 cannot pass inwardly into the central bore 52, but otherwise are freely movable therein.

A tubular or cylindrical inner sleeve 61 is disposed within the central bore 52 of the coupler body 50 and concentric therewith. The inner sleeve 61 is closely received within the coupler body 50 in relatively tight but freely sliding relation thereto. The inner sleeve 61 circumscribes a central bore 62 which extends between upstream opening 63 and downstream opening 64. Bore 62 includes a first, relatively smooth inner surface 65 located at the upstream end of the sleeve which tapers inwardly at shoulder 65a to a central, relatively smooth inner surface 66. The central surface 66 in turn tapers outwardly at shoulder 66a to a third, relatively smooth inner surface 67 at the downstream end of the sleeve. The dimensions of the central bore 62 of the inner sleeve can vary depending upon the nipple or body size or style, but in general, the central bore has a dimension which is designed to securely receive the nipple 14.

The outer surface 68 of the inner sleeve 61 includes a first, shallow groove or channel 69 formed on the upstream and adjacent to a second, deeper groove or channel 70. The grooves 69, 70 preferably extend circumferentially around the outer periphery of the inner sleeve, and are designed to receive the first set of coupling balls 60, as will be described herein in more detail.

The inner sleeve 61 is biased outwardly (downstream) toward the opening 53 of the coupler body by a coiled compression spring 71. Spring 71 is received within the larger diameter surface 55 of bore 52 and extends between shoulder 56 and the upstream end of sleeve 61. An annular end cap 72 retains inner sleeve 61 within the coupler body. End cap 72 includes a central opening 74 dimensioned to receive nipple 14, and an inwardly and axially-extending flange 75. The flange 75 on end cap 72 is received in a shallow counterbore 76 on the inside surface of the coupler body near the open end of the coupler body. The distal end of the coupler body 50 surrounding opening 53 can be bent or otherwise tapered inwardly to retain end cap 72 within the coupler body.

The inner sleeve 61 also includes a plurality of bores or apertures 77 extending radially inward circumferentially around the sleeve. Preferably the inner sleeve includes a minimum of three bores in equal, spaced-apart relation to each other around the circumference of the sleeve. Each bore receives a coupling ball member 78 to define an inner set of coupling balls. Bores 77 are also inwardly tapered to such an extent that coupling balls 78 will not pass entirely radially inward therethrough, but are otherwise freely movable. In the disconnected condition, the second set of coupling balls 78 normally can move radially outward into channel 58 in the inside surface of the coupler body, and are normally captured between channel 58 on coupler body 50 and the inner taper of the bores 77.

The coupler socket 12 further includes a tubular or cylindrical outer tubular or cylindrical sleeve 80 disposed radially outward from coupler body 50 and concentric therewith. The outer sleeve 80 is closely received about the coupler body 50 in relatively tight but sliding relation thereto. Outer sleeve 80 circumscribes a central bore 81 and includes an exterior surface 82 which is appropriately gnarled or embossed to enable easy grasping and manipulation by the user. A first relatively smooth inner surface 84 is provided at the upstream end of the bore 81, which tapers inwardly at shoulder 85 to a second relatively smooth inner surface 86 at the downstream end of the bore 81. The outer coupling balls 60 are normally captured between the shoulder 85 of the outer sleeve and the outer surface 68 of the inner sleeve. The outer coupling balls 60 normally prevent the outer sleeve 80 from moving rearwardly (upstream) by contacting shoulder 85 on the outer sleeve. The outer sleeve 80 also includes an inwardly-projecting circumferential flange 89 which abuts a corresponding shoulder (unnumbered) formed in the outer surface 51 of the coupler body 50 to prevent the outer sleeve from moving forwardly (downstream) off the coupler body.

Figure 1A:
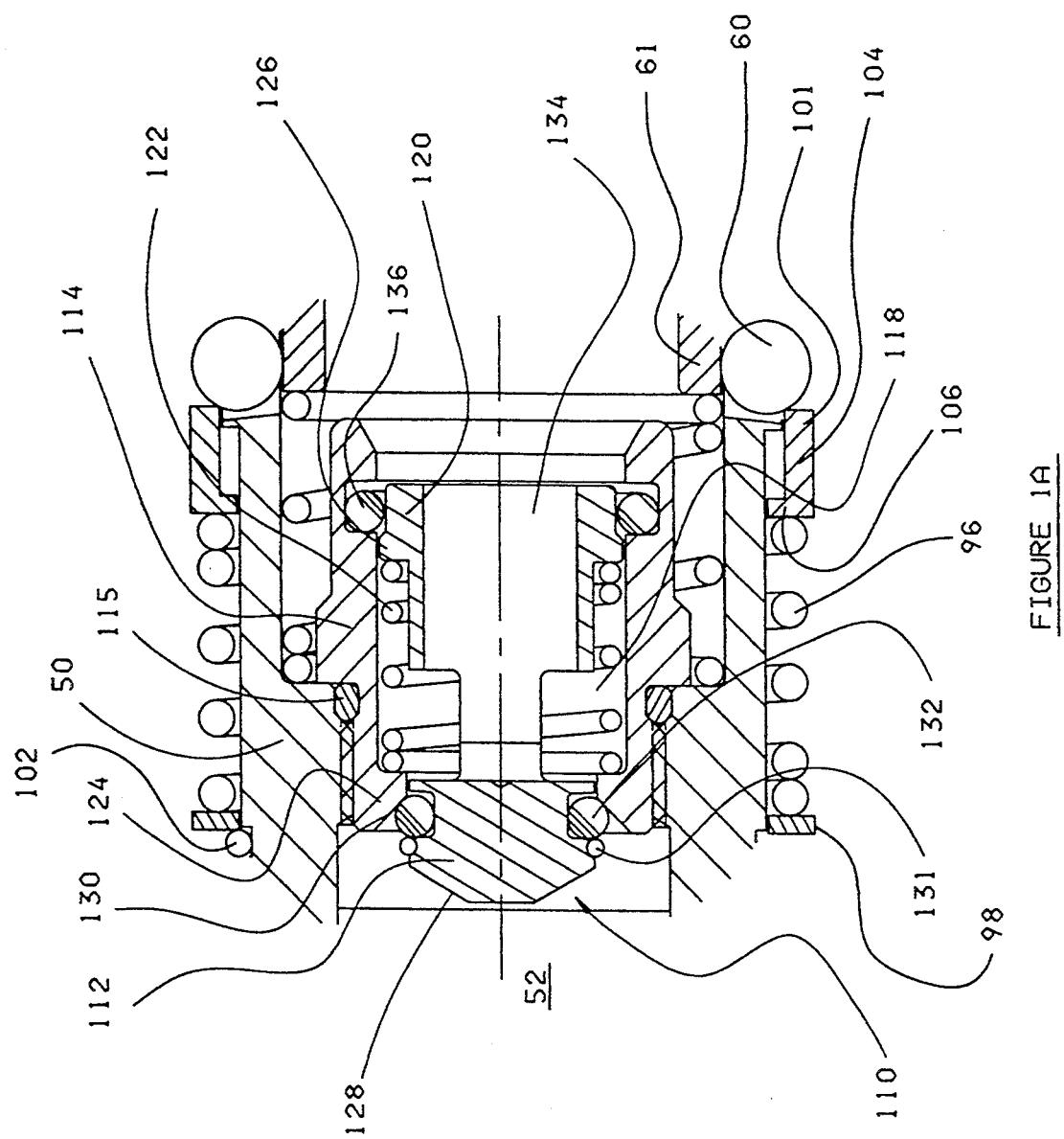
FIG. 1A is an enlarged partial view, in section, of the valve assembly for the coupler of FIG. 1.

A locking mechanism, indicated generally at 100, is interposed between the inside surface 84 of the outer sleeve and the outer surface 51 of the coupler body. Referring now to FIG. 1A, the locking mechanism includes a coiled compression spring 96 which extends between a stop 98 and a locking member 101. Stop 98 is in the form of an annular washer or disk and is held axially in place by a retaining mechanism 102 (e.g., a metal snap ring). Retaining mechanism 102 is received within a circumferential groove (unnumbered) formed in the outer surface 51 of the coupler body 50. The locking member 101 is preferably a tubular sleeve and includes an axial head portion 104 extending in adjacent relation to the inside surface 84 of the outer sleeve 80 (FIG. 1), and a radial inwardly-extending leg 106 which serves as a stop or rest for spring 96. The locking member 101 is normally maintained in a slightly compressed condition by the outer set of coupling balls 60 being urged radially outward by the inner sleeve 61.

A valve assembly, indicated generally at 110, is located centrally within bore 52 of the coupler body 50. According to one embodiment of the present invention, the valve assembly includes a valve member 112 located within a valve sleeve 114. Valve sleeve 114 includes threads on the exterior surface thereof which engage corresponding threads on the interior surface of coupler body 50 to mount the valve sleeve to the coupler body. An elastomeric 0-ring type seal 115 is located between the valve sleeve 114 and the coupler body 50 to provide a fluid-tight seal therebetween. The valve sleeve 114 also includes a central bore 118 which receives the body 120 of the valve member 112 in relatively tight but sliding relation thereto. A coiled compression spring 122 extends between a radially-inward extending flange 124 on the valve sleeve 114, and a radially-outward extending flange 126 formed on the valve body. The compression spring 122 biases valve head 128 axially against a seat formed by the open end 130 of the valve sleeve 114. An appropriate elastomeric O-ring seal 132 is located within a groove (unnumbered) in the valve head to fluidly seal against the mouth 130. An annular spring clip 13 1 is received in an adjacent shoulder (unnumbered) formed in the valve head to retain the 0-ring seal on the valve head, and prevent valve member 112 from passing downstream through valve sleeve 114 in case of over pressurization. Valve body 120 further includes an axially-extending bore 134 which directs fluid centrally through the valve body. An additional elastomeric O-ring-type seal 136 is located in a groove (unnumbered) in the valve sleeve 114 to provide a seal between the valve sleeve 114 and the nipple, as will be described herein in more detail.

Figure 2:
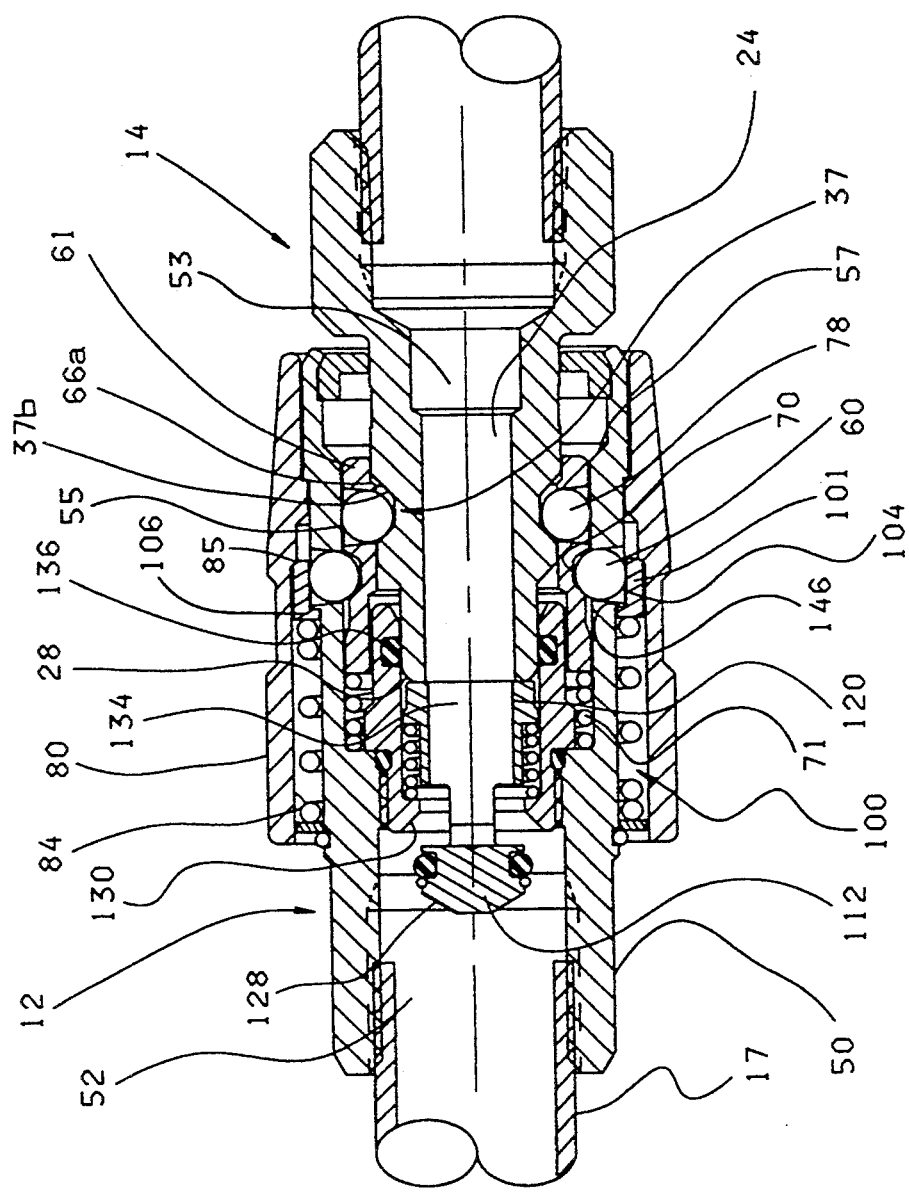
FIG. 2 is a view, in section, of the coupler of FIG. 1, showing the coupler in the fully engaged position.

Referring now to FIG. 2, the nipple 14 can be inserted axially into the coupler socket 12 such that the nipple end 28 engages and is axially aligned with the body 120 of the valve member 112. The nipple moves the valve member upstream within bore 52 such that valve head 128 is moved away from seat 130. The open valve member allows pressurized air in fluid conduit 17 upstream of coupler socket 12 to flow around valve head 128, through bore 134 in valve body 120 and into bore 24 in nipple 14. O-ring seal 136 seals against the upstream end of nipple 14 when the nipple is fully inserted into the coupler socket to prevent fluid flow around the outside of the nipple. To retain the nipple 14 within the coupler socket 12, shoulder 37b on the nipple engages the shoulder 66a on inner sleeve 61 to move the inner sleeve forward (upstream), away from the opening 53, and against the bias of spring 71. In so doing, shoulder 57 on coupler body 50 drives coupling balls 78 radially inward into the channel 37 on the nipple, where the coupling balls are retained between the inside surface 55 of the coupler body and the channel 37. At the same time, the outer coupling balls 60 become aligned with the deeper channel 70 in the outside surface of the inner sleeve.

The coupling balls 60 are driven radially inward into the channel 70 by the spring-biased head portion 104 of the locking member 101 moving between the coupling balls and the inside surface 84 of sleeve 80. The locking member 101 of the locking mechanism 100 slides completely between the locking balls 60 and the outer sleeve to prevent the locking balls from moving radially outward. The head 104 of the locking member rests against shoulder 85 on outer sleeve 80, while the leg 106 of the locking member abuts a flange 146 extending radially outward from coupler body 50. The outer set of coupling balls 60 are thereby captured between locking member 101 and deep channel 70 in inner sleeve 61. Thus, the combined action of the locking mechanism 100, outer coupling balls 60, inner coupling balls 78, and the corresponding surfaces on the inner sleeve 61 and the nipple 14 retain the nipple within the coupler socket 12.

Figure 3:
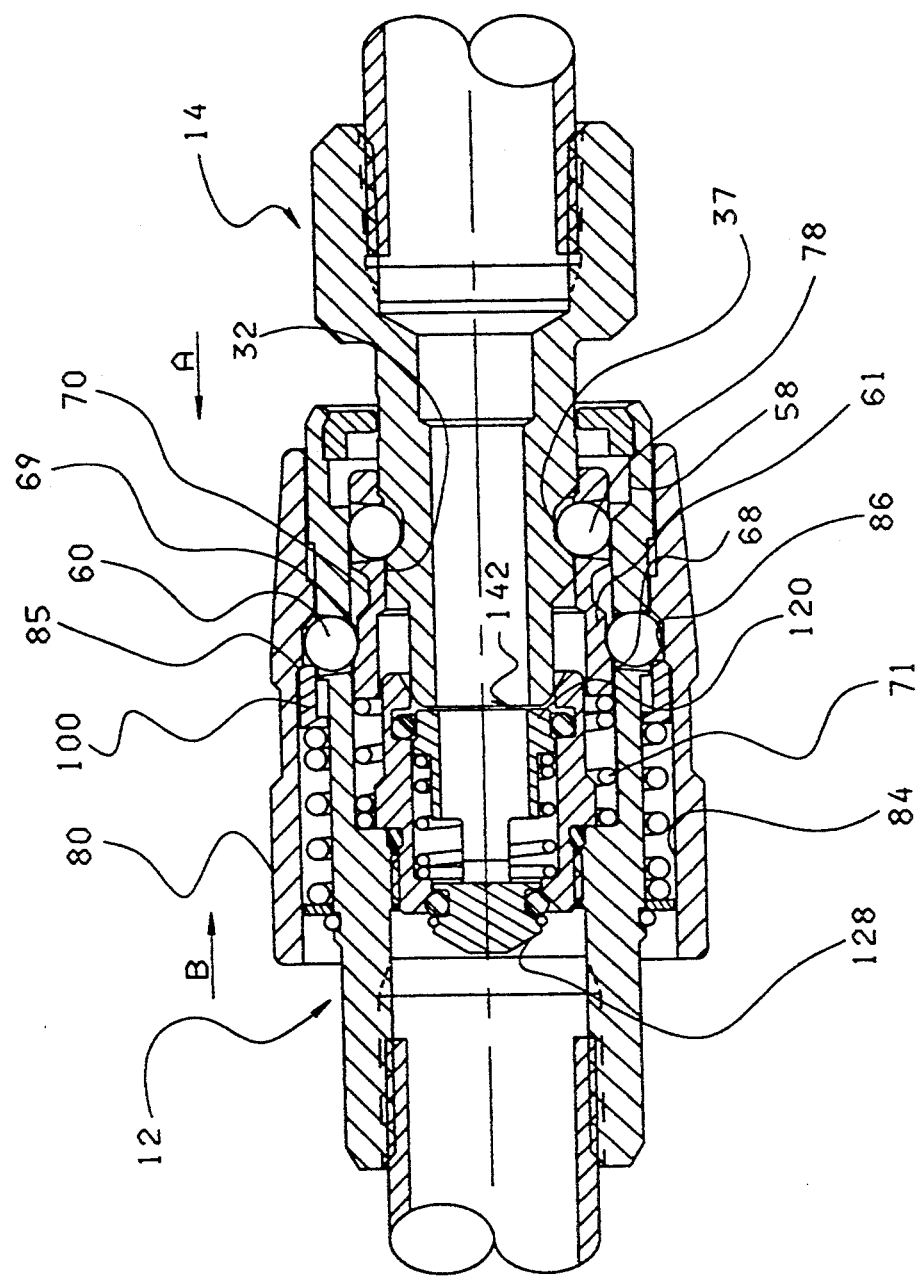
FIG. 3 is a view, in section, of the coupler of FIG. 1, showing the coupler in the intermediate, venting position.

Referring now to FIG. 3, when it is desirable to remove the nipple 14 from the coupler socket 12, the outer sleeve 80 on the coupler socket is initially retracted (moved upstream), as indicated generally by the arrow A. In so doing, the shoulder 85 on the outer sleeve engages the locking member 101 and moves the locking member axially rearward (upstream) against its bias. The locking member 101 moves away from the outer set of coupling balls 60, which releases the outer coupling balls and allows the outer coupling balls 60 to move radially outward against the inside surface 86 of the outer sleeve. The inner sleeve 61 also moves outwardly (downstream) when the outer coupling balls are released by the urging of spring 71. The radial distance of surface 86 is enough to allow balls 60 to move out of deeper groove 70, but not enough to allow the balls to pass out of shallower groove 69. The inner sleeve is prevented from moving further outwardly by the locking balls being restrained in groove 69 by the inner surface 86 of the outer sleeve. The amount that the inner sleeve, and hence nipple 14, are allowed to move outwardly is sufficient to allow the valve head 128 of the valve member to return to a closed position to seal off upstream pressure, and also to create a gap, indicated generally at 142, between the upstream end of nipple 14 and the downstream end of valve body 120. Pressurized air within the nipple (and downstream from the nipple) is allowed to vent through gap 142 and through the gaps between the coupler socket components to the atmosphere.

When the pressure within the nipple is exhausted and it is desired to fully remove the nipple from the coupler socket, the outer sleeve 80 is moved in the forward (downstream) direction, indicated generally at the arrow B. In so doing, the inner surface 86 of the outer sleeve is moved away from the outer coupling balls 60, which further releases the outer coupling balls and allows the outer coupling balls 60 to move further radially outward against the inner surface 84 of the outer sleeve 80. When the outer coupling balls are released, the inner sleeve 61 is biased further outwardly (downstream) from the coupler body by spring 71, which urges the outer coupling balls 60 against the outer sleeve. The urging of the outer coupling balls 60 against the outer sleeve prevents the locking member 101 from moving between the coupling balls and the outer sleeve. As such, the outer coupling balls 60 are allowed to move out of the shallower groove 69 in the inner sleeve 61, and ride against the outer surface 68 of the inner sleeve. Further, as the inner sleeve 61 moves outwardly from the body, the inner set of coupling balls 78 on the inner sleeve are allowed to move radially outward into groove 58 in the coupler body, and out of engagement with nipple groove 37. When the inner set of coupling balls 78 move radially outward, the ridge 32 on the nipple is allowed to pass between the inner set of coupling balls such that the nipple can be fully removed from the coupler socket. The coupler socket is thereby returned to its "cocked" condition upon releasing the nipple such that the coupler socket is prepared for the next connection.

As will be appreciated from the above discussion, the coupler socket is formed from relatively few parts having primarily axial movements, which makes the coupler relatively simple and inexpensive to manufacture and assemble. The cylindrical coupler body 50, inner sleeve 61 and outer sleeve 80 can be efficiently manufactured on equipment common to the quick coupling industry, and assembled using conventional techniques. Moreover, the coupler is simple and easy to use and provides an intermediate venting function which seals off upstream pressure, and allows downstream pressure to vent out through the coupler socket before entirely disconnecting the nipple.

Figure 4:
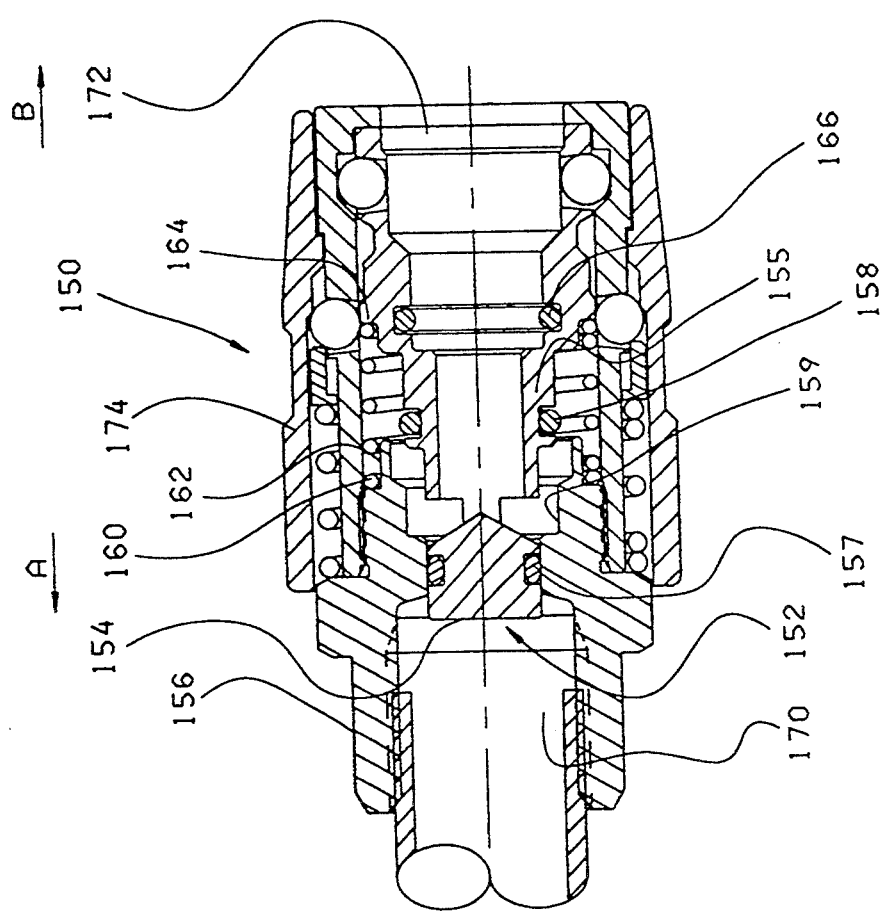
FIG. 4 is a view, in section, of another embodiment of the coupler socket for the coupler of FIG. 1.

Another embodiment of a coupler socket for the coupler is illustrated in FIG. 4. In this embodiment, the coupler socket, indicated generally at 150, includes a valve assembly 152 having a valve member 154 which is formed in one piece with inner sleeve 155. An elastomeric O-ring type seal 157 is disposed within a channel or groove (not numbered) in the valve member 154 to provide a fluid seal against coupler body 156. An additional elastomeric O-ring-type seal 158 is disposed in an exterior groove on the sleeve 155 to seal against counterbore 159 in the coupler body 156 when the nipple is inserted and the inner sleeve is moved rearwardly (upstream). In this embodiment, only a single compression spring 160 is necessary to bias the valve sleeve 155 and valve member 154 outwardly (downstream) within the coupler. Spring 160 is received around an annular flange 162 extending axially away from the downstream end of coupler body 156, and extends between coupler body 156 and an outwardly projecting circumferential flange 164 on the inner sleeve 155. An additional elastomeric O-ring type seal 166 can also be received in a groove (unnumbered) formed in the inside surface of the valve sleeve 155 to seal against the nipple. The remaining structure of coupler socket 150 is substantially the same as in the first embodiment, and will not be described herein for sake of brevity.

When a nipple is inserted into the coupler socket 150, the valve member 152 is moved axially rearward (upstream) within the coupler body 156 to allow fluid to flow from the upstream opening 170 of the coupler socket to the downstream opening 172. As in the first embodiment, manipulating outer sleeve 174 in an upstream direction, as indicated by the arrow "A", and then in a downstream direction, as indicated by the arrow "B", moves the nipple to an intermediate venting position and then fully disconnects the nipple from the coupler socket in the same manner as previously.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A coupler comprising a body, an inner sleeve, an outer sleeve, and a locking mechanism to lock said inner sleeve in either of two axially spaced-apart positions relative to said body, said body including a generally cylindrical body portion having a generally cylindrical inner wall and a generally cylindrical outer wall, a radial passage in said cylindrical body portion extending between said inner wall and said outer wall, a coupling member disposed within and radially movable within said radial passage, said outer sleeve being slidably disposed on said outer wall of said body portion adjacent said radial passage, said inner sleeve being slidably disposed on said inner wall of said body portion adjacent said radial passage, said inner sleeve including first and second stepped outer wall portions, and said outer sleeve including first and second stepped inner wall portions, said inner and outer sleeves each being axially movable relative to said body between a first position and a second position, said first stepped wall portions each being radially aligned with said passage and said coupling member and one another when said inner and outer sleeves are in said first position, and said second stepped wall portions being radially aligned with said passage and said coupling member and one another when said inner and outer sleeves are in said second position.

2. The coupler as set forth in claim 1, wherein said coupling member engages said first stepped wall portion of said inner sleeve when said outer sleeve is in said first position to retain said inner sleeve in said first position, and said coupling member engages said second stepped wall portion of said inner sleeve when said outer sleeve is in said second position to retain said inner sleeve in said second position.

3. The coupler as set forth in claim 2, wherein said locking mechanism includes a locking member, said locking member being axially slidably disposed on said outer wall of said body between said body and said outer sleeve, said locking member having a first position and a second position, said locking member being radially aligned with said first stepped wall portions and said passage and said coupling member when said locking member and said inner sleeve are in said first position to retain said coupler member against said first stepped wall portion of said inner sleeve.

4. The coupler as set forth in claim 3, wherein said inner sleeve includes a second coupling member for locking a nipple within said inner sleeve when said inner sleeve is in said first and second positions.

5. The coupler as set forth in claim 4, further including said nipple locked within said inner sleeve by said second coupler member, and a seal disposed within said inner wall of said body, said nipple engaging said seal when said inner sleeve is in said first position, and said nipple being axially spaced from said seal when said inner sleeve is in said second position.

6. The coupler as set forth in claim 4, wherein said body includes an open end, said inner sleeve being axially movable to a third position proximate said open end, said second locking mechanism being inoperable to lock said nipple in said inner sleeve when said inner sleeve is in said third position, said inner sleeve being movable axially toward said open end as said inner sleeve moves from said first position to said second position and from said second position to said third position, and said outer sleeve being in said first position when said inner sleeve is in said third position.

7. The coupler as set forth in claim 6, wherein said locking member is axially spaced from said radially aligned position when said outer sleeve is in said second position and when said inner sleeve is in said third position.

8. The coupler as set forth in claim 4 further including a valve member within said coupler body, said valve member normally biased into a closed position to block a fluid flow path through the coupler socket, and being movable into an open position by the nipple when the nipple is located within said inner sleeve when said inner sleeve is in said first position.

9. A coupler socket for a nipple, the coupler socket comprising:
   i) a coupler body having an inner wall surface defining an axial bore and an open end to receive the nipple, said coupler body also including a first set of coupling members disposed about the coupler body and movable in a radial direction, and a recess formed in the inner wall surface proximate the open end of the body,
   ii) an inner sleeve disposed in the axial bore of said coupler body and biased axially outward toward the open end of the coupler body, said inner sleeve having an inner wall surface defining a nipple cavity dimensioned to receive the nipple, and an outer wall surface with a pair of recesses of different radial depths, and including a second set of coupling members disposed about the inner sleeve and movable in a radial direction, said inner sleeve normally being axially disposed relative to said coupler body such that said second set of coupling members can move radially outward into the recess in said coupler body, the inner sleeve moving axially away from the open end of the coupler body into a coupled position when the nipple is inserted into the open end of the coupler socket, thereby driving said second set of coupling members radially inward into engaging relation with the nipple,
   iii) an outer sleeve surrounding the coupler body and being axially movable with respect thereto,
   iv) a valve member mounted within the coupler body and normally biased to a closed position to block a fluid flow path through the coupler socket, said valve member being engaged by the nipple and moved into an open position when the nipple is inserted into the open end of the coupler socket to open the fluid flow path through the coupler socket, and
   v) a locking mechanism disposed between said outer sleeve and said coupler body, said locking mechanism biasing said first set of coupling members radially inward into engagement with a first of said pair of recesses in the outer surface of said inner sleeve when the nipple is inserted into the open end of the coupler body and the inner sleeve moves away from the open end to a) retain said first set of coupling members in said first recess, b) retain said inner sleeve in the coupled position, and c) retain the nipple within the coupler socket, said outer sleeve having an inner surface configuration which engages and moves said locking mechanism out of engagement with said first set of coupling members when said outer sleeve is moved in a first axial direction such that said first set of coupling members move radially outward a predetermined distance out of said first of said pair of recesses such that a) said inner sleeve is biased a predetermined distance axially outward toward the open end of the coupler body, b) said valve member moves into the closed position, and c) said first set of coupling members are retained in engagement with said second of said pair of recesses on the outer surface of said inner sleeve, said inner surface of said outer sleeve also having a configuration which allows said first set of coupling members to move further radially outward when said outer sleeve is moved in a second axial direction, opposite from said first axial direction, to a) allow said first set of coupling members to move out of engagement with said second of said pair of recesses on the outer surface of the inner sleeve, b) allow the inner sleeve to be biased further axially outward toward the open end of the coupler body, and c) allow the second set of coupling members to move radially outward into the recess in the inner wall surface of the coupler body to thereby release the nipple and allow the nipple to be disconnected from the coupler socket.

10. The coupler socket as in claim 9, wherein said locking mechanism includes an axially movable annular sleeve, a stop member fixed to the outer surface of the coupler body, and a spring disposed between the stop member and the annular sleeve which biases the annular sleeve against the first set of coupling members.

11. The coupler socket as in claim 9, further including a valve sleeve disposed in the coupler body bore, and wherein said valve member includes a head with a sealing device to seal against the valve sleeve, a spring which biases the valve head into sealing engagement with the valve sleeve when the valve member is in the closed position, and a valve body extending axially away from the valve head and which is engaged by the nipple when the nipple is inserted into the coupler body.

12. The coupler socket as in claim 11, wherein said valve body has an axial bore extending centrally therethrough which forms a fluid flow path through the valve member when said nipple engages the valve member and moves the valve member into the open position.

13. The coupler socket as in claim 12, wherein said valve member includes a head with a sealing device to seal against the coupler body, a spring which biases the valve head into sealing engagement with the coupler body when the valve member is in the closed position, and a valve body extending axially away from the head and which is engaged by the nipple when the nipple is inserted into the coupler body.

14. The coupler socket as in claim 13, wherein said valve body is formed in one piece with said inner sleeve.

15. The coupler socket as in claim 9, wherein the inner surface of said outer sleeve includes a larger diameter portion, a smaller diameter portion, and a tapered shoulder interconnecting the larger diameter portion and the smaller diameter portion which is dimensioned to engage said locking mechanism when said outer sleeve is moved in said first axial direction.

16. The coupler socket as in claim 9, wherein said outer sleeve, inner sleeve and coupler body all have tubular configurations and are disposed in concentric relation to one another.

17. The coupler socket as in claim 16, wherein said first and second set of coupling members comprise coupling balls which are received in radially-extending apertures in the coupler body and the inner sleeve, respectively, and are freely movable therein.

18. The coupler socket as in claim 17, wherein said coupler balls and radially-extending apertures are disposed in even, spaced-apart relation around the circumference of the coupler body and the inner sleeve.

19. The coupler socket as in claim 18, wherein said recess in said coupler body and said pair of recesses in said inner sleeve are formed circumferentially around the coupler body and inner sleeve.

20. The coupler socket as in claim 9, wherein a spring is disposed within a counterbore formed in the inner surface of the coupler body to bias the inner sleeve outwardly toward the open end of the coupler body.

21. A coupler socket, comprising:

a) a tubular coupler body having i) an annular inner wall surface defining an axial bore and an open end, ii) a plurality of radially-extending apertures disposed circumferentially around the coupler body, iii) a first set of coupling balls disposed in the apertures in the coupler body and freely movable therein, and iv) a recess extending circumferentially around the inside surface of the coupler body proximate the open end of the coupler body, b) a tubular inner sleeve disposed in the axial bore of the coupler body and axially movable with respect thereto, said inner sleeve having i) an inner wall surface defining a nipple cavity and an outer wall surface with a pair of recesses extending circumferentially around the inner sleeve, a first of said pair of recesses having a greater radial depth than the other of said pair of recesses and being located closer to the open end of the coupler body, ii) a plurality of radially-extending apertures disposed circumferentially around the inner sleeve, and iii) a second set of coupling balls disposed in the apertures in the inner sleeve and freely movable therein, said inner sleeve normally being axially disposed relative to said coupler body such that said second set of coupling balls are movable radially outward into the recess in the coupler body and said first set of coupling balls are disposed along the outer wall surface of the inner sleeve in an area outside of the pair of recesses, said inner sleeve being axially movable relative to said coupler body such that said second set of coupling balls are driven into engagement with the nipple when the nipple is inserted into the nipple cavity and said second set of coupling balls are aligned with the deeper of the two recesses in the outer surface of the inner sleeve, c) a spring disposed within the bore of the coupler body and biasing the inner sleeve toward the open end of the coupler body, d) a valve member mounted axially within the coupler body and normally biased into a closed position to block a fluid flow path through the coupler socket, and being movable into an open position when the nipple is inserted into the coupler socket to provide a fluid flow path through the coupler socket, e) an outer sleeve surrounding the coupler body and axially movable with respect thereto, and f) a locking mechanism disposed between said outer sleeve and said coupler body, said locking mechanism normally urging said first set of coupling balls radially inward against said inner sleeve and retaining said first set of coupling balls in the deeper of the pair of recesses in the outer surface of the inner sleeve when said second set of coupling balls are aligned with the deeper of the pair of recesses, said outer sleeve having an inner surface configuration which i) engages said locking mechanism and moves said locking mechanism out of engagement with said first set of coupling balls when said outer sleeve is moved on a first axial direction, ii) retains said first set of coupling balls within the shallower of the pair of recesses in the outer surface of the inner sleeve when said outer sleeve is moved in the first axial direction and iii) allows said first set of coupling balls to move radially outward out of engagement with the shallower of the pair of recesses in the outer surface of the inner sleeve when said outer sleeve is moved in a second axial direction, such that said inner sleeve can move axially outward toward the open end of the coupler body and said second set of coupling balls can move radially outward into the recess in the coupler body to release the nipple.

22. The coupler socket as in claim 21, wherein said inner wall surface of said coupler body includes a diametrically larger surface portion proximate the open end of the coupler body, and a diametrically smaller surface portion spaced from the open end of the coupler body, said diametrically larger surface portion defining a counterbore and said spring being disposed within said counterbore.

23. The coupler socket as in claim 21, wherein said apertures in said coupler body and in said inner sleeve have a radially tapered configuration.

24. The coupler socket as in claim 21, wherein the inner surface of said outer sleeve includes a larger diameter portion, a smaller diameter portion, and a tapered shoulder interconnecting the larger diameter portion and the smaller diameter portion which is dimensioned to engage said locking mechanism when said outer sleeve is moved in said first radial direction.

25. The coupler socket as in claim 21, further including a valve sleeve disposed in the coupler body bore, and wherein said valve member includes a head with a sealing device to seal against the valve sleeve, a spring which biases the valve head into sealing engagement with the valve sleeve when the valve member is in the closed position, and a valve body extending axially away from the valve head and which is engaged by the nipple when the nipple is inserted into the coupler body.

26. The coupler socket as in claim 21, wherein said valve member includes a head with a sealing device to seal against the coupler body, a spring which biases the valve head into sealing engagement with the coupler body when the valve member is in the closed position, and a valve body extending axially away from the head and which is engaged by the nipple when the nipple is inserted into the coupler body.

27. The coupler socket as in claim 21, wherein said locking mechanism includes an annular sleeve surrounding said coupler body and a spring which biases said annular sleeve toward the open end of the coupler body.

* * * * *